(12) United States Patent
Aoyagi et al.

(10) Patent No.: US 11,719,179 B2
(45) Date of Patent: Aug. 8, 2023

(54) COMBUSTION SYSTEM

(71) Applicant: DENSO CORPORATION, Kariya (JP)

(72) Inventors: Kenji Aoyagi, Kariya (JP); Kayoko Kimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/980,968

(22) Filed: Nov. 4, 2022

(65) Prior Publication Data

US 2023/0046872 A1 Feb. 16, 2023

Related U.S. Application Data

(63) Continuation of application No. PCT/JP2021/021364, filed on Jun. 4, 2021.

(30) Foreign Application Priority Data

Jun. 22, 2020 (JP) .................................. 2020-107120

(51) Int. Cl.
*F02D 41/40* (2006.01)
*F02D 41/14* (2006.01)
*F02D 13/02* (2006.01)
*F02P 5/152* (2006.01)
*F02D 41/38* (2006.01)

(52) U.S. Cl.
CPC ..... *F02D 41/1497* (2013.01); *F02D 13/0215* (2013.01); *F02D 41/401* (2013.01); *F02P 5/152* (2013.01); *F02D 2041/389* (2013.01)

(58) Field of Classification Search
CPC .... F02D 41/1497; F02D 41/401; F02D 41/34; F02D 13/0215; F02D 13/02; F02D 2041/389; F02D 43/00; F02D 45/00; F02P 5/152; F02P 5/15; Y02T 10/12; Y02T 10/40; F02B 23/10; F02M 51/06; F02M 61/18
USPC ...................... 701/103–105, 111; 73/141.32; 123/406.21, 406.29, 406.34, 406.37, 123/406.38, 406.39, 90.11, 90.15, 299, 123/300, 305
See application file for complete search history.

(56) References Cited

U.S. PATENT DOCUMENTS

| 6,390,059 B1 | 5/2002 | Shiraishi et al. |
| 6,427,659 B2 | 8/2002 | Shiraishi et al. |
| 2001/0015194 A1 | 8/2001 | Shiraishi et al. |

(Continued)

FOREIGN PATENT DOCUMENTS

| JP | H8-121285 | 5/1996 |
| JP | H11-173180 | 6/1999 |

(Continued)

*Primary Examiner* — Hai H Huynh
(74) *Attorney, Agent, or Firm* — Nixon & Vanderhye P.C.

(57) ABSTRACT

A combustion system is applied to an engine. The combustion system includes an injection device that injects a fuel into a combustion chamber, a spark plug that ignites fuel in the combustion chamber, and a control device that controls the injection device and the spark plug. The control device includes a first control unit that executes predetermined first control. In the first control, control is performed such that, a total injection amount corresponding to all the fuel injected by the injection device in one combustion cycle of the engine is injected within a first period corresponding to a period from valve close timing which brings an intake valve into a closed state until a first half of a compression stroke of the engine ends.

13 Claims, 9 Drawing Sheets

(56) References Cited

U.S. PATENT DOCUMENTS

| | | |
|---|---|---|
| 2002/0144671 A1 | 10/2002 | Shiraishi et al. |
| 2004/0159721 A1 | 8/2004 | Shiraishi et al. |
| 2006/0118079 A1 | 6/2006 | Shiraishi et al. |
| 2009/0194069 A1 | 8/2009 | Ashizawa |

FOREIGN PATENT DOCUMENTS

| | | |
|---|---|---|
| JP | 2000-328997 | 11/2000 |
| JP | 2002-339848 | 11/2002 |
| JP | 4161828 | 10/2008 |
| JP | 2019-190450 | 10/2019 |

(a) NORMAL CONTROL (b) FIRST CONTROL (c) SECOND CONTROL

COMBUSTION SYSTEM

CROSS REFERENCE TO RELATED APPLICATION

The present application is a continuation application of International Patent Application No. PCT/JP2021/021364 filed on Jun. 4, 2021, which designated the U.S. and claims the benefit of priority from Japanese Patent Application No. 2020-107120 filed on Jun. 22, 2020. The entire disclosures of all of the above applications are incorporated herein by reference.

TECHNICAL FIELD

The present disclosure relates to a combustion system.

BACKGROUND

Conventionally, a known device executes a control for suppressing knock in an engine.

SUMMARY

According to an aspect of the present disclosure, a combustion system is applicable to an engine. The engine includes a combustion chamber, an intake passage to take in air into the combustion chamber, an intake valve to open and close the intake passage, an exhaust passage to exhaust gas from the combustion chamber, and an exhaust valve to open and close the exhaust passage. The combustion system comprises: an injection device configured to inject fuel into the combustion chamber; a spark plug configured to ignite fuel in the combustion chamber; and a control device configured to control the injection device and the spark plug.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
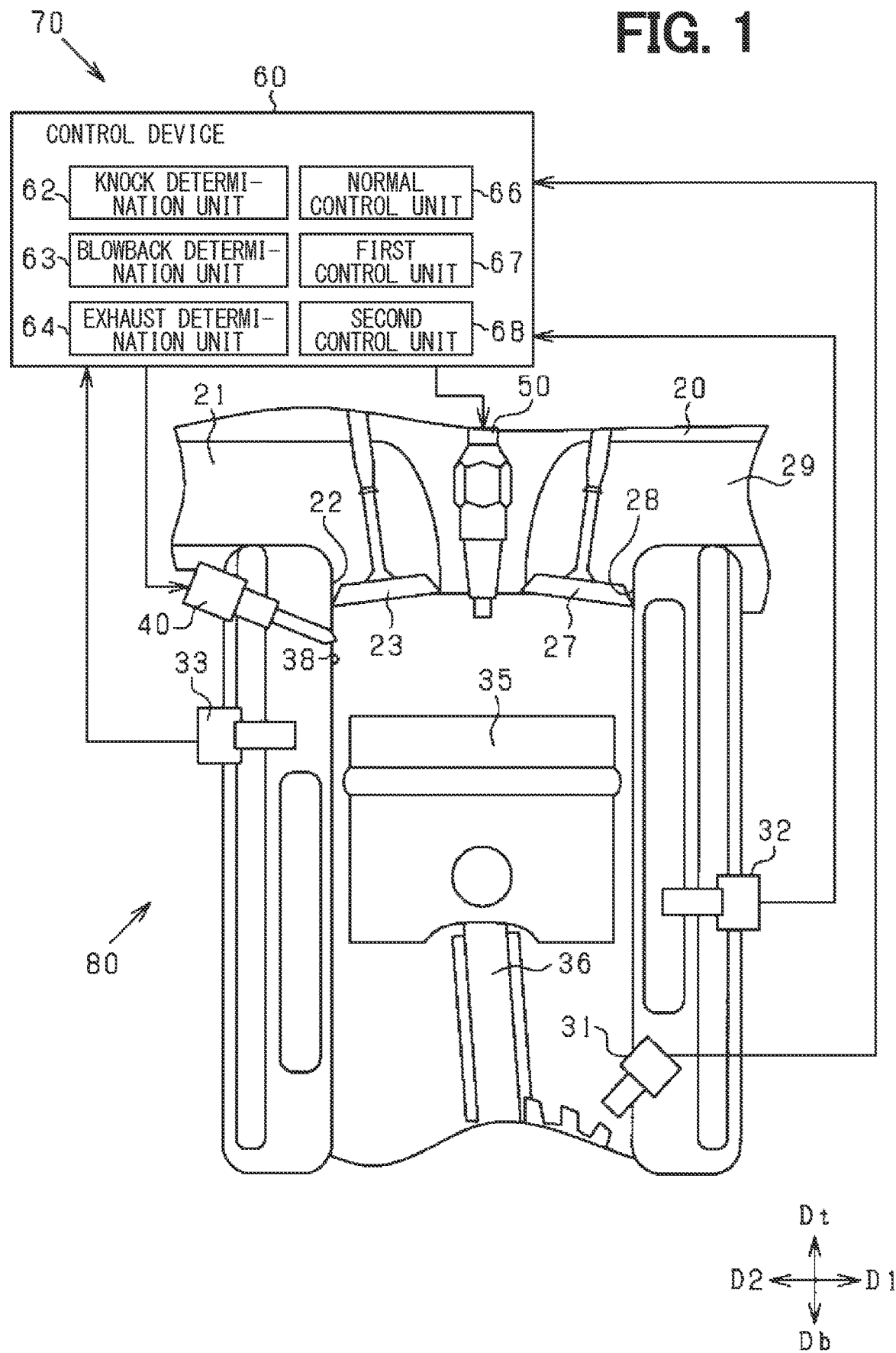
FIG. 1 is a cross-sectional view illustrating a combustion system in a first embodiment and periphery thereof.

Hereinafter, examples of the present disclosure will be described. According an example of the present disclosure, a combustion system executes a control for suppressing knock in situations in which the knock may occur in an engine. Specifically, under the control for suppressing the knock, fuel injection is performed in a second half of a compression stroke. In a state in which a gas flow in a combustion chamber is accelerated by the fuel injection, ignition is performed by a spark plug. Thus, flame propagation is accelerated. In this manner, auto-ignition is suppressed to suppress the knock.

In the example, as described above, the fuel is injected in the second half of the compression stroke immediately before the ignition to accelerate the flame propagation and suppress the auto-ignition. However, depending on engine specifications, when the fuel injection is performed in the second half of the compression stroke, the injection is consequently performed against an airflow such as a tumble occurred in the combustion chamber. This may conversely weaken the airflow or may not be able to satisfactorily intensify the airflow, even though the airflow is not weakened. In such cases, the function described above, i.e., the function of accelerating the flame propagation by the fuel injection in the second half of the compression stroke and suppressing the auto-ignition cannot efficiently be performed.

According to an example of the present disclosure, a combustion system is applicable to an engine. The engine includes a combustion chamber, an intake passage to take in air into the combustion chamber, an intake valve to open and close the intake passage, an exhaust passage to exhaust gas from the combustion chamber, and an exhaust valve to open and close the exhaust passage. The combustion system comprises: an injection device configured to inject fuel into the combustion chamber; a spark plug configured to ignite fuel in the combustion chamber; and a control device configured to control the injection device and the spark plug.

The control device includes a first control unit that executes predetermined first control. In the first control described above, a control is performed such that a total injection amount corresponding to all of fuel to be injected by the injection device in one combustion cycle of the engine is injected within a first period from valve close timing at which the intake valve is brought into a closed state until a first half of the compression stroke of the engine ends.

According to this configuration, the following effects can be achieved. In the first control, after the valve close timing for the intake valve, fuel is injected by the total injection amount. Therefore, it is possible to prevent an air-fuel mixture temporarily cooled by vaporization heat from being blown back to an intake passage and reduce a period during which the temporarily cooled air-fuel mixture stays in the combustion chamber or the like compared to that in a case where the temporarily cooled air-fuel mixture is blown back thereto. Accordingly, it is possible to reduce an amount of heat received by the fuel-gas mixture from an inner wall of the combustion chamber or the like in the meantime and efficiently reduce a temperature in the combustion chamber in the vicinity of a compression top dead center or the like.

Further, in the first control, the total injection amount is injected before the first half of the compression stroke ends. Thus, it is possible to reduce a specific heat ratio in the combustion chamber at an early stage. Note that the specific heat ratio is reduced because a specific heat ratio of the fuel is lower than a specific heat ratio (e.g., 1.4) of air. In addition, a temperature rise due to compression is smaller when compression is performed in a state in which the specific heat ratio is thus reduced than in a case where compression is performed at an original specific heat ratio.

Accordingly, by injecting the total injection amount before the first half of the compression stroke ends and reducing the specific heat ratio in the combustion chamber at the early stage, it is possible to more significantly suppress the temperature rise due to compression than in a case where injection is performed in the middle of a second half of the compression stroke to reduce the specific heat ratio in the middle of the second half of the compression stroke.

As described above, the air-fuel mixture is suppressed to receive heat, and is temporarily cooled by the vaporization heat. In this way, the vaporization heat is effectively used, and simultaneously the specific heat ratio is reduced at the early stage. Thus, it is possible to reduce the temperature in the combustion chamber in the vicinity of the compression top dead center. This can suppress auto-ignition of the fuel and thereby suppress occurrence of knock. Therefore, the first control can attain the major object described above, i.e., can suppress the knock by using a mechanism other than that of accelerating flame propagation by the fuel injection in the second half of the compression stroke.

Referring to the drawings, a description will be given next of embodiments of the present disclosure. Note that the present disclosure is not limited to the embodiments, and can be implemented by being appropriately modified within a scope not departing from the gist of the disclosure.

First Embodiment

First, a description will be given of an outline of the present embodiment. As illustrated in FIG. 1, a combustion system 70 in the present embodiment is applied to an engine 80. The engine 80 includes a piston 35, a combustion chamber 38 that is repeatedly reduced and enlarged in size with a reciprocating motion of the piston 35, an intake passage 21 that takes in air into the combustion chamber 38, an intake valve 23 that opens and closes the intake passage 21, an exhaust passage 29 that exhausts a gas in the combustion chamber 38 therefrom, and an exhaust valve 27 that opens and closes the exhaust passage 29.

The combustion system 70 includes an injection device 40 that injects a fuel F into the combustion chamber 38, a spark plug 50 that ignites the fuel F in the combustion chamber 38, and a control device 60 that controls the injection device 40 and the spark plug 50. The control device 60 includes a knock determination unit 62, a blowback determination unit 63, and an exhaust determination unit 64.

The knock determination unit 62 determines whether or not a knock region state as a state in which knock may possibly occur in the engine 80 is established. The blowback determination unit 63 determines whether or not a state of occurrence of blowback of the gas from the combustion chamber 38 to the intake passage 21 falls within a predetermined allowable range. Specifically, the blowback determination unit 63 determines, on the basis of a rotation speed of the engine 80, whether or not the state of occurrence of the blowback falls within the allowable range. More specifically, the blowback determination unit 63 is more likely to determine that the state of occurrence of the blowback falls within the allowable range when the rotation speed of the engine 80 is higher than a predetermined speed than when the rotation speed is equal to the predetermined speed. The exhaust determination unit 64 determines whether or not a state of exhaust from the engine 80 falls within a predetermined allowable range.

The control device 60 further includes a normal control unit 66, a first control unit 67, and a second control unit 68. The normal control unit 66 executes predetermined normal control α illustrated in (a) in FIG. 4 on the condition it is determined by the knock determination unit 62 that the nock region state is not established. The first control unit 67 executes first control β1 illustrated in (b) in FIG. 4 on the condition that it is determined by the knock determination unit 62 that the knock region state is established, and it is also determined by the blowback determination unit 63 that the state of occurrence of the blowback does not fall within the allowable range. The second control unit 68 executes second control β2 illustrated in (c) in FIG. 4 on the condition that it is determined by the knock determination unit 62 that the knock region state is established, and it is also determined by the blowback determination unit 63 that the state of occurrence of the blowback falls within the allowable range.

Figure 4:
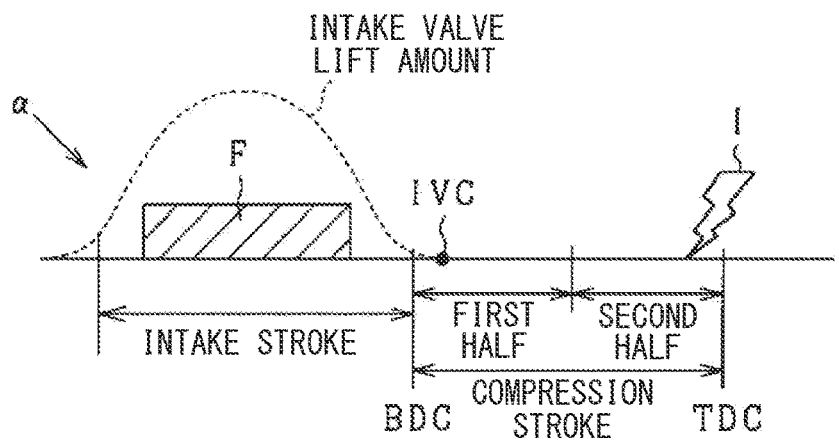
FIG. 4 is a time chart illustrating each control by the combustion system.
Figure 4:
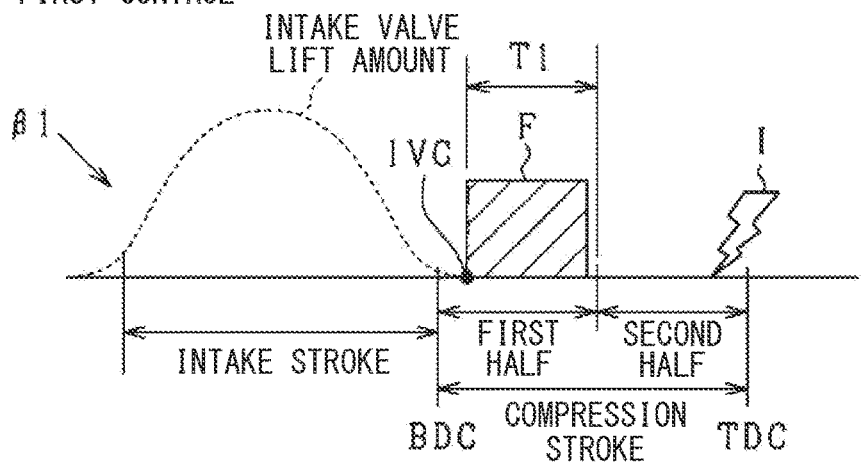
Figure 4:
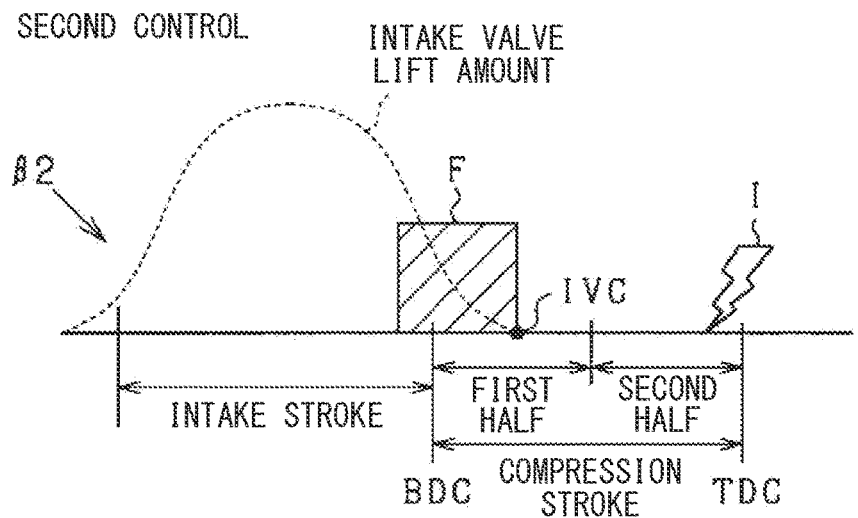

In the first control β1 illustrated in (b) in FIG. 4, control is performed such that a total injection amount corresponding to all of the fuel F to be injected by the injection device 40 in one combustion cycle of the engine 80 is injected within a first period T1 corresponding to a period from valve close timing IVC which brings the intake valve 23 into a closed state until a first half of a compression stroke of the engine 80 ends. The engine 80 is configured to be able to change the valve close timing IVC for the intake valve 23. Accordingly, in the first control β1, fuel injection start timing is changed in response to the change of the valve close timing IVC for the intake valve 23.

In a state in which the first control β1 is executed, when it is determined by the exhaust determination unit 64 that the state of exhaust does not fall within the allowable range, the first control unit 67 makes a correction by advancing the fuel injection start timing beyond the valve close timing IVC so as to perform another control other than the first control β1 or makes a correction so as to increase an injection pressure of the injection device 40.

The first control unit 67 computes ignition timing which can suppress the knock. Then, when the computed ignition timing is on an advanced side of predetermined timing, the first control unit 67 controls actual timing of ignition by the spark plug 50 to the computed ignition timing. Meanwhile, when the computed ignition timing is on a delayed side of the predetermined timing, the first control unit 67 does not delay the actual timing of ignition by the spark plug 50 from the predetermined timing, but increases the injection pressure of the injection device 40.

In the second control β2 illustrated in (c) in FIG. 4, control is performed such that injection of the fuel F is started earlier than in the case of the first control β1. Specifically, in the second control β2, control is performed such that the injection of the fuel F is started before the later one of an intake bottom dead center BDC and the valve close timing IVC, and injection of the total injection amount in one combustion cycle is ended at the later timing. In the second control β2, the timing of ending the injection described above is changed in response to the change of the valve close timing IVC for the intake valve 23.

As illustrated in FIG. 1 or the like, it is assumed hereinbelow that, among directions of the reciprocating motion of the piston 35, the direction in which the combustion chamber 38 is reduced in size is a "top dead center direction Dt", and the direction opposite thereto is a "bottom dead center direction Db". It is also assumed that a predetermined direction perpendicular to the directions of the reciprocating motion is a "predetermined direction D1", a direction opposite thereto is an "anti-predetermined direction D2", a direction including the predetermined direction D1 as a component is a "predetermined direction D1 side", and a direction including the anti-predetermined direction D2 as a component is an "anti-predetermined direction D2 side". The injection device 40 is placed with an injection center line corresponding to an average of directions in which the total injection amount described above is injected facing the predetermined direction D1 side.

Figure 2:
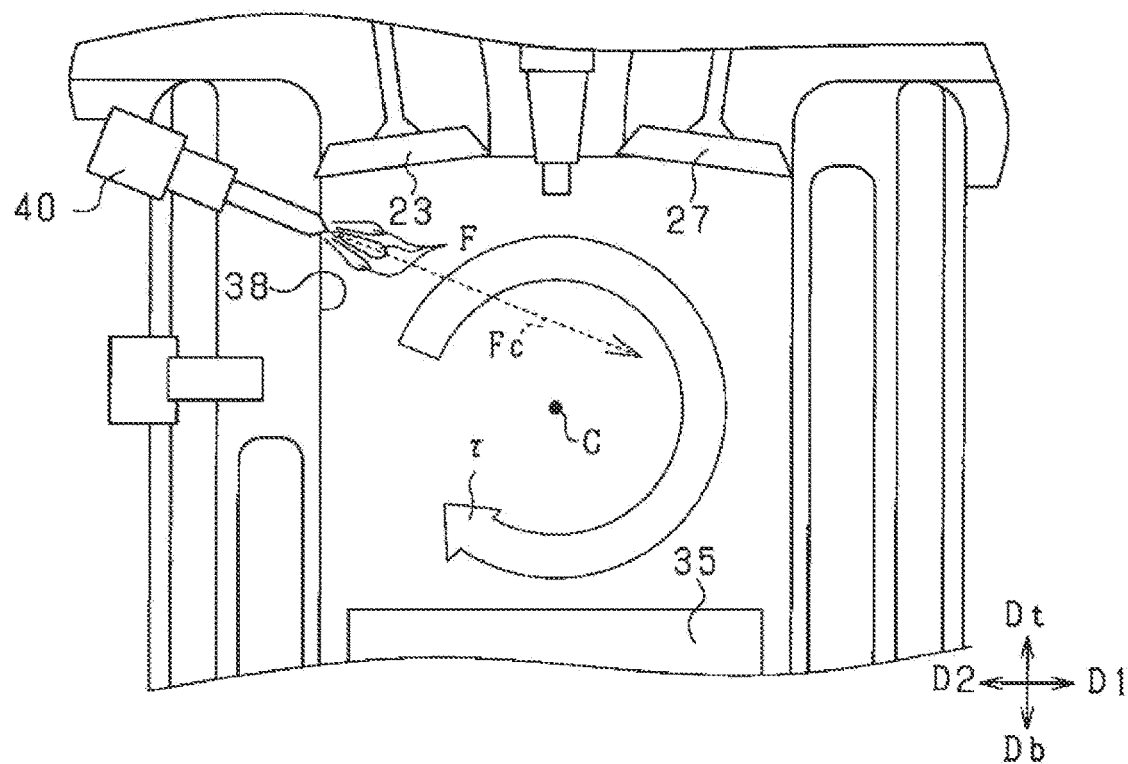
FIG. 2 is a cross-sectional view illustrating a first half of a compression stroke of an engine.
Figure 3:
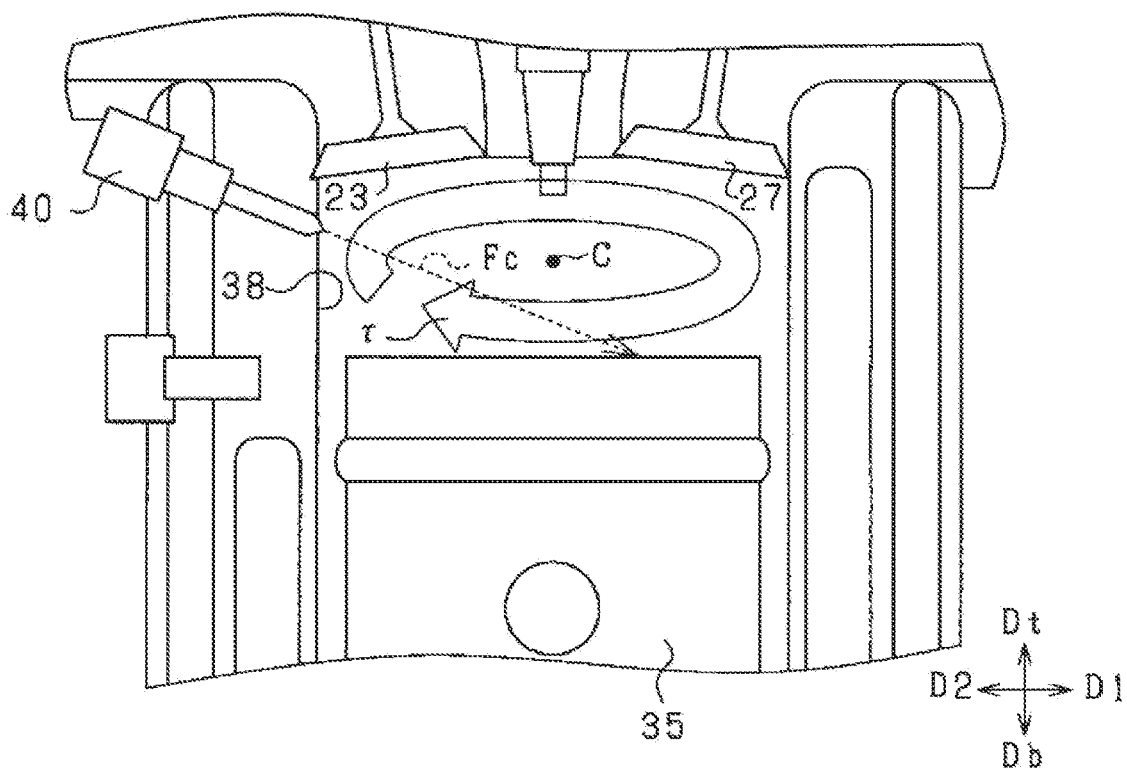
FIG. 3 is a cross-sectional view illustrating a second half of the compression stroke of the engine.

As illustrated in FIGS. 2 and 3, the engine 80 is configured such that a tumble τ is generated in the combustion chamber 38. The tumble τ flows on the predetermined direction D1 side in the top dead center direction Dt from a rotation center C thereof, while flowing on the anti-predetermined direction D2 side in the bottom dead center direction Db from the rotation center C thereof.

The rotation center C of the tumble τ moves in the top dead center direction Dt as the combustion engine 38 is reduced in size. Then, as illustrated in FIG. 2, in the first half of the compression stroke, a cooperative injection state as a state having a positional relationship in which a virtual extension line Fc of the injection center line extends through a portion in the top dead center direction Dt from the rotation center C of the tumble τ, i.e., the tumble flows on the predetermine direction D1 side is established. Meanwhile, as illustrated in FIG. 3, in a second half of the compression stroke, a counter injection state as a state having a positional relationship in which the virtual extension line Fc of the injection center line extends through a portion in the bottom dead center direction Db from the rotation center C of the tumble τ, i.e., the tumble τ flows on the anti-predetermined direction D2 side is established.

Then, in the first control β1, as illustrated in FIG. 2, control is performed such that, at timing at which the cooperative injection state described above is established in the first half of the compression stroke, the injection is executed by the injection device 40. Preferably, within a period during which the cooperative injection state described above is established, the total injection amount in one combustion cycle is injected.

Figure 8:
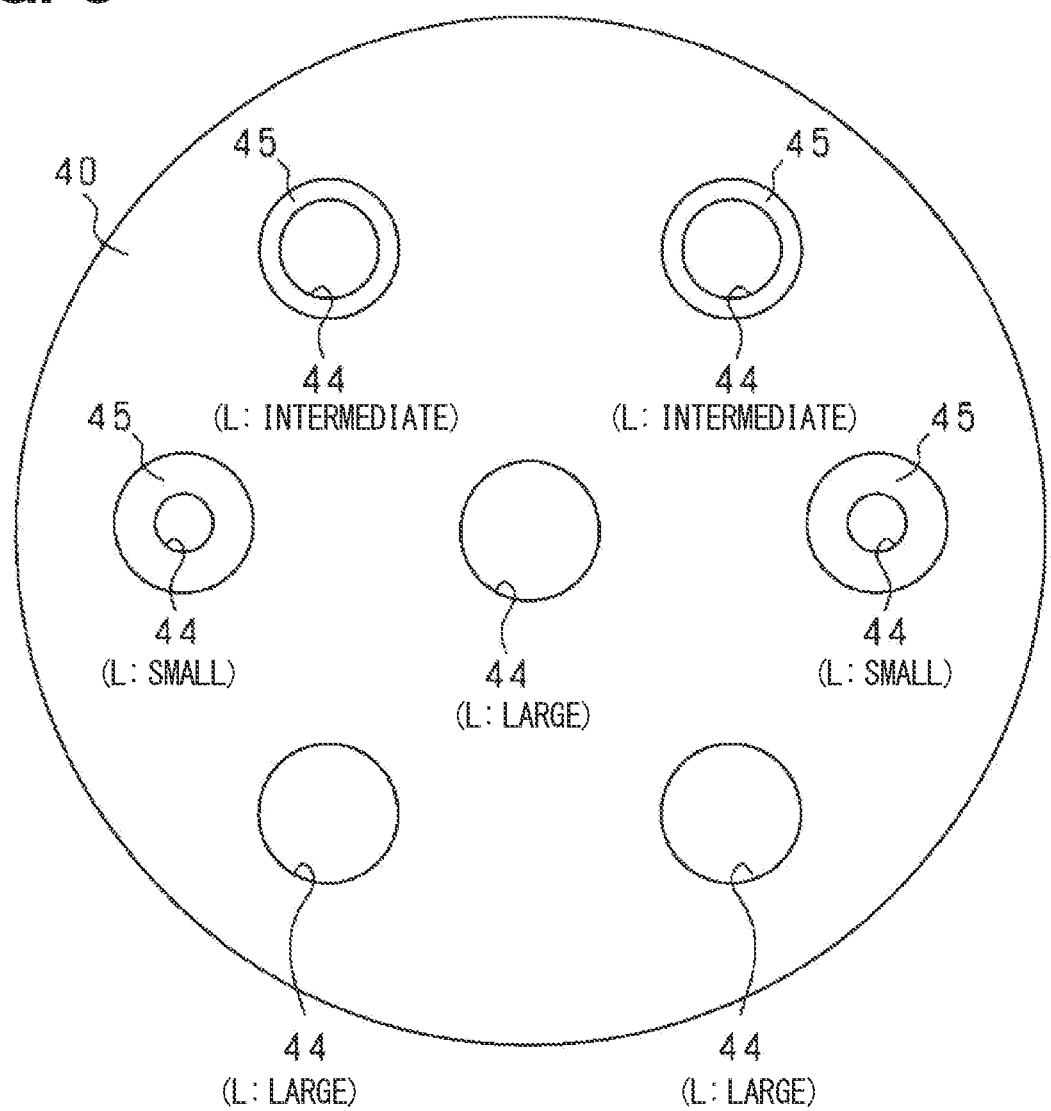
FIG. 8 is a diagram illustrating individual injection holes in a leading end portion of the injection device.

As illustrated in FIG. 8, in the injection device 40, a plurality of injection holes 44 that inject the fuel F are provided, and at least some of the injection holes 44 are provided with atomization structures 45 for atomizing the fuel F to be injected. Each of the atomization structures 45 has at least either one of a widening structure which widens in a tapered form or a stepwise form with advance on an injection direction side and an oval structure having an oval opening.

Figure 6:
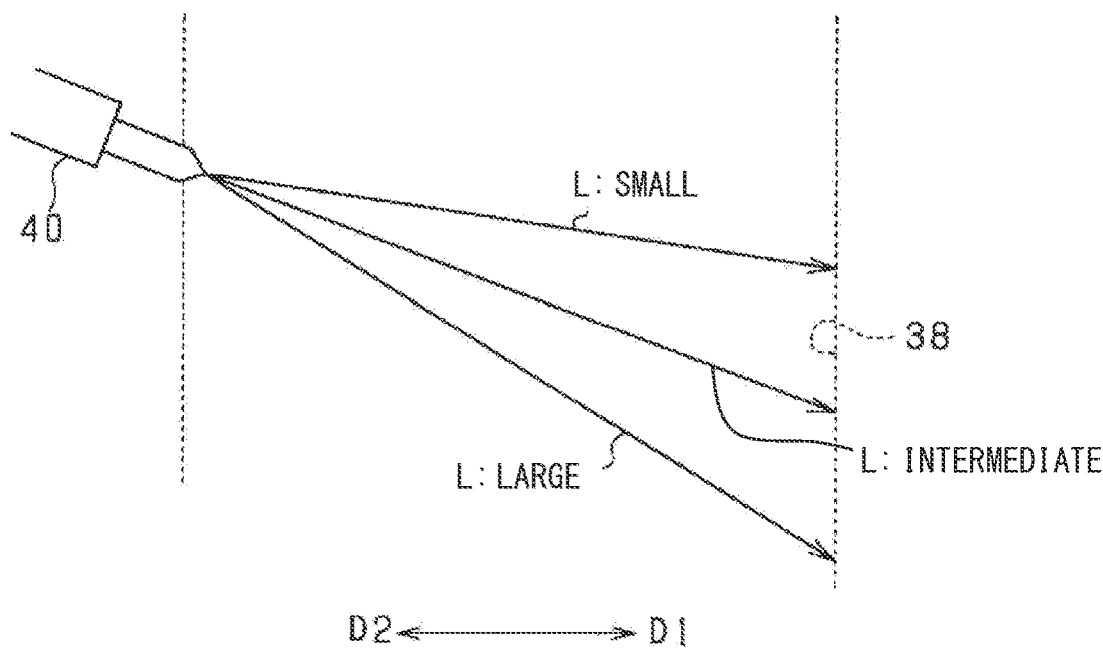
FIG. 6 is a side view illustrating injection by an injection device.
Figure 7:
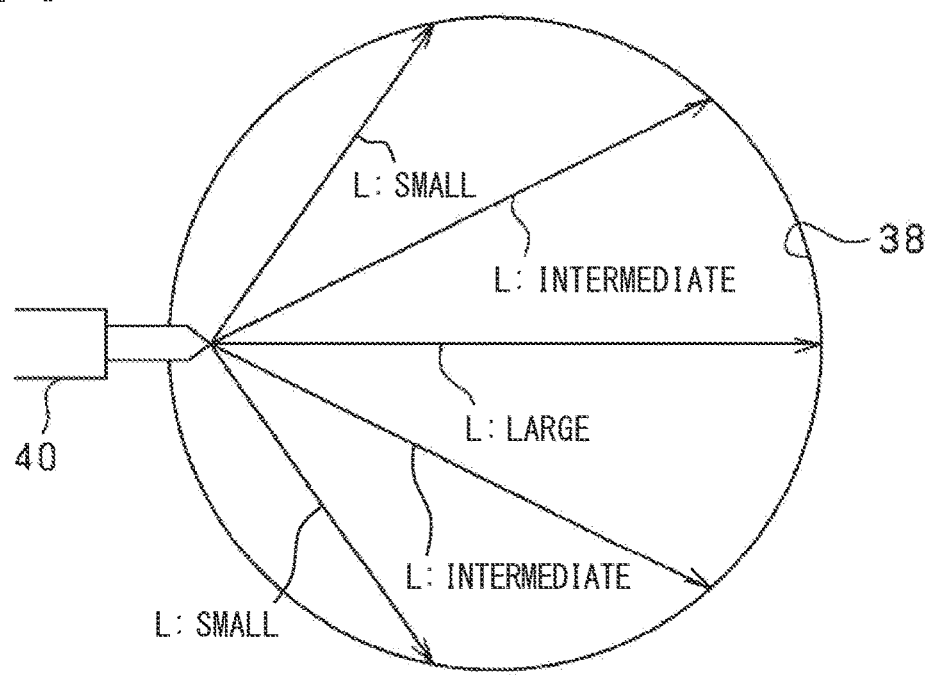
FIG. 7 is a plan view illustrating the injection by the injection device.

It is assumed hereinbelow that a lengthwise direction of a center line of each of the injection holes 44 is an "injection direction" of the injection hole 44, while a portion of an inner wall of the combustion chamber 38 facing directly in front of each of the injection holes 44 in the injection direction when the fuel F is injected is a "facing portion" to the injection hole 44. Additionally, it is assumed that, as illustrated in FIGS. 6 and 7, a distance from each of the injection holes 44 to the facing portion to the injection hole 44 is a "front distance L" of the injection hole 44. In the present embodiment, the combustion system is configured as follows. The fuel F injected from the injection hole 44 at the front distance L, which is shorter than a predetermined length. At the same, the fuel F is injected from the injection hole 44 at the front distance L, which is equal to the predetermined length. Penetration of the fuel F injected from the injection hole 44 at the front distance L shorter than a predetermined length is lower than penetration of the fuel F injected from the injection hole 44 at the front distance L equal to the predetermined length.

Next, a description will be given of details of the present embodiment in a form in which a summary of the present embodiment is supplemented.

FIG. 1 is a cross-sectional view illustrating the engine 80. The engine 80 is a 4-stroke engine in which one combustion cycle includes four strokes which are an intake stroke, the compression stroke, an expansion stroke, and an exhaust stroke. The one combustion cycle is 720 CA (crank angles). The intake bottom dead center BDC forms a boundary between the intake stroke and the compression stroke, while a compression top dead center TDC forms a boundary between the compression stroke and the expansion stroke. The first half of the compression stroke is a period of 180 to 90 CA before the compression top dead center, while the second half of the compression stroke is a period of 90 to 0 CA before the compression top dead center. Accordingly, a point at which the first half of the compression stroke ends is 90 CA before the compression top dead center.

Note that a description will be given below on the assumption that, on the basis of the drawings, a p dead center direction Dt side is an upper side, while a bottom dead center direction Db side is a lower side. However, the engine 80 and the combustion system 70 can be placed in any direction such that, e.g., the top dead center direction Dt and the bottom dead center direction Db are set obliquely to a vertical direction or the top dead center direction Dt and the bottom dead center direction Db are set in a horizontal direction.

The engine 80 includes a cylinder 30 and a head 20 attached to an upper part thereof. In the cylinder 30, the piston 35 is placed. The piston 35 is connected to a crankshaft (the illustration of which is omitted) via a link 36 to vertically move with rotation of the crankshaft. Above the piston 35, the combustion chamber 38 is formed.

An opening of the intake passage 21 to the combustion chamber 38 forms an intake port 22, while an opening of the exhaust passage 29 to the combustion chamber 38 forms an exhaust port 28. The intake valve 23 is driven by an intake cam (the illustration of which is omitted), while the exhaust valve 27 is driven by an exhaust cam (the illustration of which is omitted). Between the intake cam and a shaft thereof, the intake cam and the intake valve 23, and the like, a variable device (the illustration of which is omitted) for changing drive timing for the intake valve 23 and a lift amount thereof is placed. This allows valve open timing and the valve close timing IVC for the intake valve 23 to be changed.

The predetermined direction D1 described above is a direction from an intake port 22 side to an exhaust port 28 side. The anti-predetermined direction D2 described above is a direction from the exhaust port 28 side to the intake port 22 side.

The injection device 40 is placed in a wall portion of the upper part of the cylinder 30 on an anti-predetermined direction D2 side in a state in which the injection center line is obliquely inclined with respect to the predetermined direction D1 in the bottom dead center direction Db. The spark plug 50 is placed in a portion of the head 20 located at a center portion of a ceiling portion of the combustion chamber 38.

In the engine 80, various sensors such as a crank angle sensor 31 that detects a rotation angle of the crankshaft, a vibration sensor 32 that detects vibration occurring in the engine 80, and an inner pressure sensor 33 that detects a pressure in the combustion chamber 38 are placed.

The knock determination unit 62 may determine whether or not a knock region state is established on the basis of various parameters such as, e.g., the rotation speed of the engine 80, a load, and a water temperature or may generally determine whether or not the knock region state is established on the basis of these parameters and additional other parameters. As the other parameters mentioned above, the vibration detected by the vibration sensor 32, a result of a fuel property determination obtained by determining a property of the fuel F, and the like are shown by way of example.

The blowback determination unit 63 is allowed to more easily determine that the state of occurrence of the blowback falls within the allowable range as the rotation speed of the engine 80 is higher. The blowback determination unit 63 may determine the state of occurrence of the blowback on the basis only of the rotation speed of the engine 80, or may also determine the state of occurrence of the blowback on the basis of the inner pressure of the combustion chamber 38, an inner pressure of the intake passage 21, and the like in addition thereto.

For example, the exhaust determination unit 64 may determine, as the state of exhaust, whether or not an amount of CO emission falls within a predetermined allowable range, whether or not an amount of PM emission falls within a predetermined allowable range, or whether both of the amount of CO emission and the amount of PM emission fall within the predetermined allowable ranges.

When the amount of CO emission is to be determined, the amount of CO emission may be measured by providing, e.g., a CO sensor or, alternatively, the amount of CO emission may also be computed from a temperature rise in a catalyst due to CO. When the amount of PM emission is to be determined, the amount of PM emission may also be measured by providing, e.g., a PM sensor or, alternatively, the amount of PM emission may also be computed from a temperature rise in the catalyst due to PM. Note that the amount of PM emission mentioned herein may be, e.g., the number of particles (PN) of emitted PM or may also be a mass of the emitted PM.

FIG. 2 is a cross-sectional view illustrating the first half of the compression stroke of the engine 80. When the injection of the fuel F is thus executed by the injection device 40 in the cooperative injection state in which the virtual extension line Fc of the injection center line extends through the portion in the top dead center direction Dt from the rotation center C of the tumble τ, the injection of the fuel F cooperates with the tumble τ to efficiently enhance the tumble τ. Consequently, it is possible to efficiently increase a turbulence intensity.

FIG. 3 is a cross-sectional view illustrating the second half of the compression stroke of the engine 80. If the injection is executed by the injection device 40 in the counter injection state in which the virtual extension line Fc of the injection center line extends through the portion in the bottom dead center direction Db from the rotation center C of the tumble τ, the fuel injection counteracts the tumble τ to weaken the tumble τ. As a result, it is not possible to efficiently increase the turbulence intensity.

(a) in FIG. 4 is a time chart illustrating the normal control α by the normal control unit 66. In the normal control α, the entire injection amount in one combustion cycle, i.e., all of the fuel F required to achieve a theoretical air-fuel ratio in the combustion chamber 38 is injected within the intake stroke. Then, in the vicinity of the compression top dead center TDC, the ignition I is performed by the fuel plug 50. Note that the broken-line curves illustrated in (a) to (c) in FIG. 4 indicate a variation of the lift amount of the intake valve 23.

(b) in FIG. 4 is a time chart illustrating the first control β1 by the first control unit 67. In the first control β1, the first period T1 corresponding to the period during which the fuel F can be injected is limited to the period from the valve close timing IVC until the first half of the compression stroke ends. Accordingly, as necessary, the injection pressure of the injection device 40 is increased to increase an amount of injection per unit time. The injection pressure can be increased by, e.g., increasing an amount of discharge from a pump (the illustration of which is omitted) that supplies a pressure to a pressure storage chamber (the illustration of which is omitted) that supplies the fuel F to the injection device 40 and thereby increasing a fuel pressure in the pressure storage chamber. Then, in the vicinity of the compression top dead center TDC, the ignition I is performed by the spark plug 50.

(c) in FIG. 4 is a time chart illustrating the second control β2 by the second control unit 68. In the second control β2, the period during which the fuel F can be injected is limited to the later one of the intake bottom dead center BDC and the valve close timing IVC, and accordingly the injection pressure of the injection device 40 is also increased herein as necessary to increase the amount of injection per unit time. Then, in the vicinity of the compression top dead center TDC, the ignition I is performed by the spark plug 50.

Figure 5:
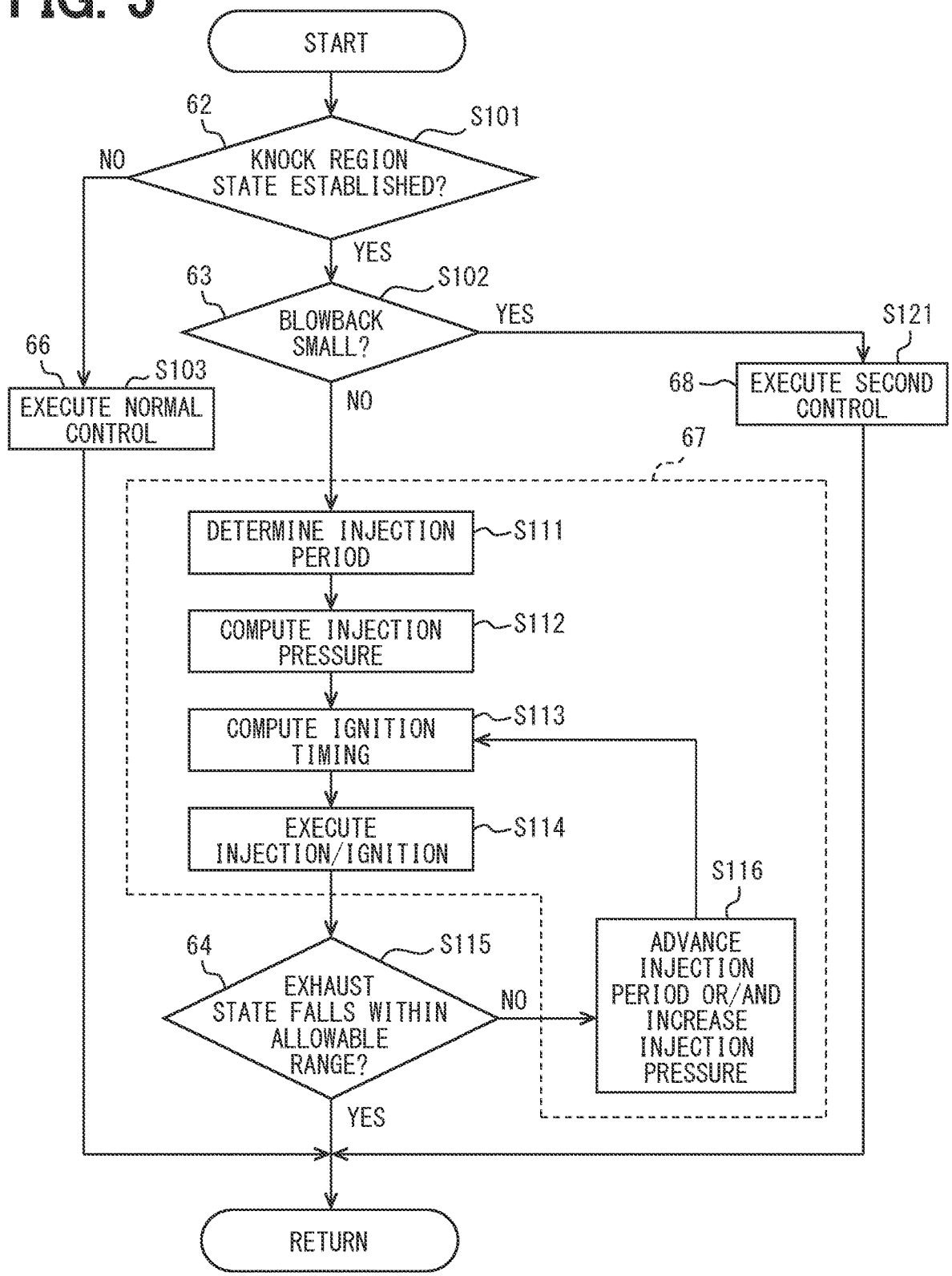
FIG. 5 is a flow chart illustrating the control by the combustion system.

FIG. 5 is a flow chart illustrating the control by the combustion unit 60. First, the knock determination unit 62 determines whether or not the knock region state is established (S101). When it is determined that the knock region state is not established (S101: NO), the normal control unit 66 performs the normal control α (S103).

Meanwhile, when it is determined that the knock region state is established in S101 (YES in S101), the blowback determination unit 63 determines whether or not the state of blowback falls within the allowable range (S102). When it is determined that the state of blowback does not fall within the allowable range (NO in S102), the control is executed by the first control unit 67.

Specifically, first, on the basis of the valve close timing IVC for the intake valve 23, an injection period during which the fuel F is to be injected is determined so as to fall within the first period T1 described above (S111). Consequently, depending on the change of the valve close timing IVC, the fuel injection start timing is changed appropriately. Then, the injection pressure required to inject the total injection amount in one combustion cycle within the determined injection period is computed (S112). The injection pressure can be computed on the basis of a map or a numerical expression that represents a relationship between each of parameters such as, e.g., the rotation speed of the engine 80 and the load on the engine 80 and the injection pressure.

Next, the ignition timing required to suppress the knock is computed on the basis also of a cooling effect obtained as a result of the first control β1 (S113). The computation can be carried out on the basis of a map or a numerical expression that represents a relationship between each of parameters representing a state of fuel injection such as, e.g., the injection period and the injection pressure and the ignition timing. However, at this time, when the computed ignition timing is on the delayed side of the predetermined timing, the ignition timing is not adopted, and the injection period determined in S111 is corrected to be shorter, while the injection pressure computed in S112 is corrected to be increased, and then the ignition timing is computed again.

Next, the injection by the injection device 40 is executed during the injection period determined in S111 and at the injection pressure computed in S112, while the ignition by the spark plug 50 is executed with the ignition timing computed in S113 (S114).

Next, by the exhaust determination unit 64, it is determined whether or not the state of exhaust falls within the allowable range (S115). When the state of exhaust falls within the allowable range (YES in S115), a control flow advances to RETURN and returns to START. Meanwhile, when it is determined that the state of exhaust does not fall within the allowable range in S115 (NO in S115), the first control unit 67 performs at least one of corrections which are advancing of the injection period and increasing of the injection pressure (S116). The correction can be made on the basis of a map or a numerical expression representing a relationship between, e.g., each of parameters representing the state of exhaust and an amount of correction. Then, the control flow returns to S113. As a result, NO continues to be given in S115 until the state of exhaust falls within the allowable range as a result of the correction in S116, and the correction in S116 is repeated.

When the injection start timing is advanced beyond the valve close timing IVC for the intake valve 23 by the correction in S116, control becomes another control not corresponding to the first control β1. Accordingly, the first control β1 is executed on the condition that, when YES is given in S101 and NO is given in S102, the injection start timing is not advanced beyond the valve close timing IVC by the correction in S116.

Meanwhile, when it is determined by the blowback determination unit 63 in S102 described above that the state of blowback falls within the allowable range (YES in S102), the second control β2 by the second control unit 68 is executed (S121). The second control β2 is also executed on the basis of the flow in which an injection time is determined first, the injection pressure is then computed, the ignition timing is then computed, the injection and the ignition are then executed, it is then determined whether or not the state of exhaust falls within the allowable range, and a correction is made appropriately when the state of exhaust does not fall within the allowable range, in the same manner as in the case of S111 to S116.

FIG. 6 is a diagram illustrating the different front distances L described above of the individual injection holes 44 provided in the injection device 40 when viewed in side view. When viewed in side view, the front direction L of the injection hole 44 that performs the injection in a direction closer to the predetermined direction D1 is shorter than the front distance L of the injection hole 44 that performs the injection more obliquely to the predetermined direction D1.

FIG. 7 is a diagram illustrating the different front distances L when viewed in plan view. When viewed in plan view, the front distance L of the injection hole 44 that performs the injection in a direction further away from a center of the combustion chamber 38 is shorter than the front distance L of the injection hole 44 that performs the injection toward the center of the combustion chamber 38.

Accordingly, the front distance L of the injection hole 44 that performs the injection in the direction closer to the predetermined direction D1 when viewed in side view and performs the injection in the direction further away from the center of the combustion chamber 38 when viewed in plan view is shortest. Meanwhile, the front distance L of the injection hole 44 that performs the injection more obliquely to the predetermined direction D1 when viewed in side view and performs the injection toward the center of the combustion chamber 38 when viewed in plan view is longest.

FIG. 8 is a diagram illustrating the plurality of injection holes 44 provided in a leading end portion of the injection device 40. The injection hole 44 having the shorter front distance L has a smaller size so as to have lower penetration, and is provided with the stronger atomization structure 45. Meanwhile, the injection hole 44 having the longer front distance L has a larger size so as to have higher penetration, and is provided with no atomization structure 45 or the smaller atomization structure 45.

Note that the higher/lower penetration mentioned herein refers to a longer/shorter distance reached by a spray tip when injection is performed in a space under the same predetermined conditions. Specifically, as the penetration is higher, the distance reached by the spray tip is longer and, as the penetration is lower, the distance reached by the spray tip is shorter.

Figure 9:
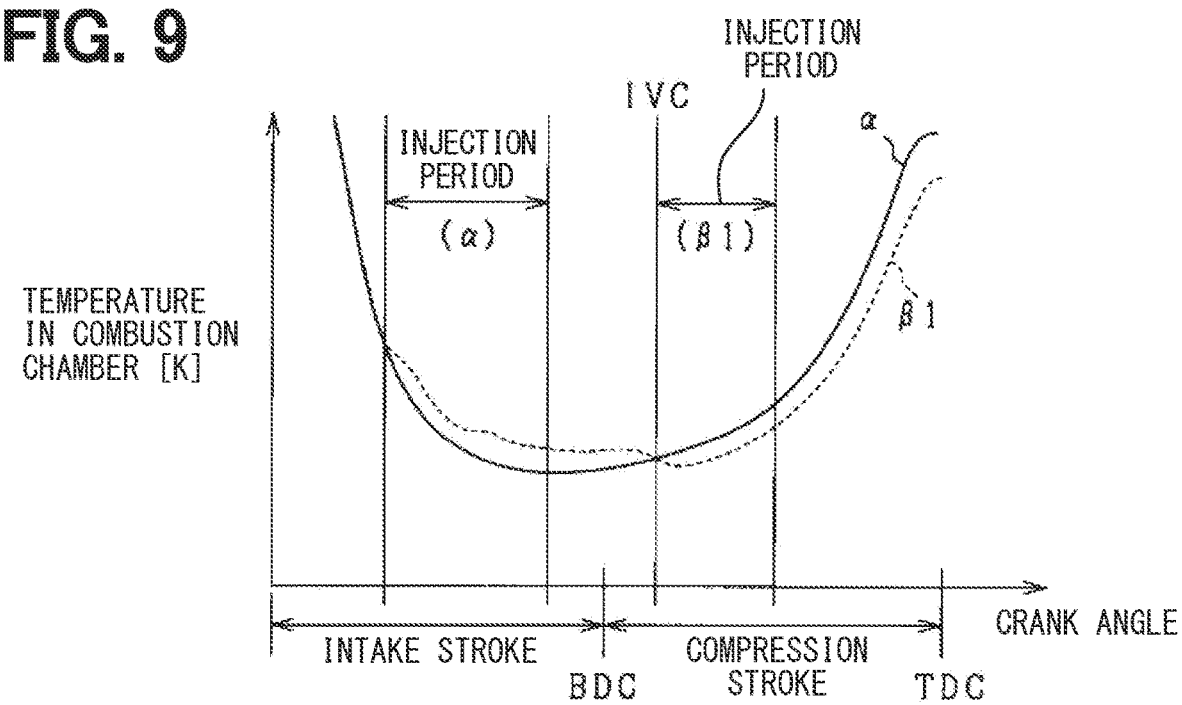
FIG. 9 is a graph illustrating time variations of a temperature in a combustion chamber.

FIG. 9 is a graph illustrating time variations of a temperature in the combustion chamber 38 in a case (solid line) where the normal control α is performed and in a case (solid line) where the first control β1 is performed. In the normal control α (solid line), the fuel F is injected in the intake stroke and, with this timing, the temperature in the combustion chamber 38 lowers due to the vaporization heat.

Meanwhile, in the first control β1 (broken line), the fuel F is injected in the first half of the compression stroke and, with this timing, a temperature of the air-fuel mixture in the combustion chamber 38 lowers due to the vaporization heat. In this case, the fuel F is injected later than in the case of the normal control α and the air-fuel mixture is not blown back to the intake passage 21, and accordingly an amount of heat received by the air-fuel mixture from the inner wall of the combustion chamber 38 or the like before the compression top dead center TDC is smaller than in the case of the normal control α. As a result, the temperature in the combustion chamber 38 at the compression top dead center TDC is lower in the case of the first control β1 than in the case of the normal control α.

Figure 10:
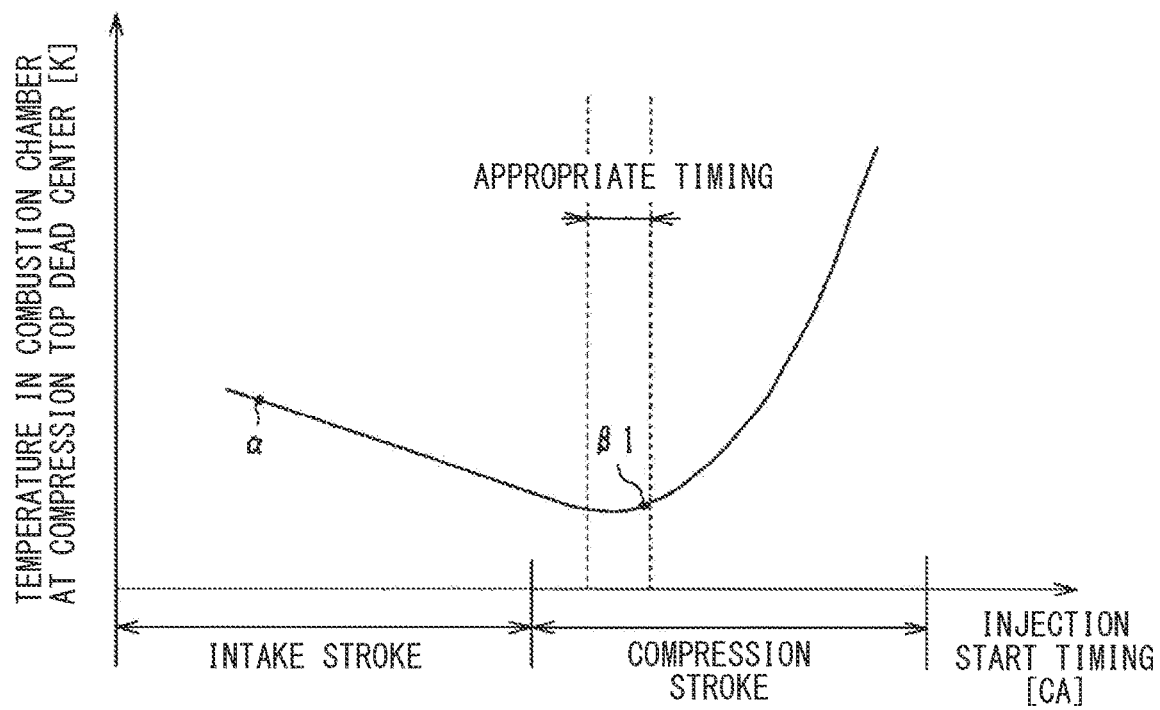
FIG. 10 is a graph illustrating a relationship between injection start timing and the temperature at a compression top dead center.

In the graph in FIG. 10, the abscissa axis represents the injection start timing, while the ordinate axis represents the temperature in the combustion chamber 38 at the compression top dead center TDC when the fuel injection is started with the injection start timing represented by the abscissa axis.

When the fuel is injected before the appropriate timing shown in FIG. 10, the amount of the heat received by the air-fuel mixture temporarily cooled by the vaporization heat resulting from the injection from the inner wall of the combustion chamber 38 or the like is larger than when the injection is performed with the appropriate timing. Consequently, the final temperature in the combustion chamber 38 at the compression top dead center TDC is higher.

Meanwhile, when the fuel is injected after the appropriate timing shown in FIG. 10, timing at which a specific heat ratio is reduced is delayed. Note that the specific heat ratio is reduced by the fuel injection because a specific heat ratio of the fuel F is lower than a specific heat ratio (e.g., 1.4) of air. The temperature rise due to the compression is smaller when the compression is performed in a state in which the specific heat ratio is reduced than when the compression is performed at the original specific heat ratio. Accordingly, when the timing at which the specific heat ratio is reduced is delayed, the temperature rise due to the compression increases. As a result, the final temperature in the combustion chamber 38 at the compression top dead center TDC is also higher herein.

By contrast, when the fuel injection is started with the appropriate timing shown in FIG. 10, it is possible to reduce the final temperature of the air-fuel mixture in the combustion chamber 38 at the compression top dead center TDC by avoiding the temperature rise caused by each of factors in a well-balanced manner.

Figure 11:
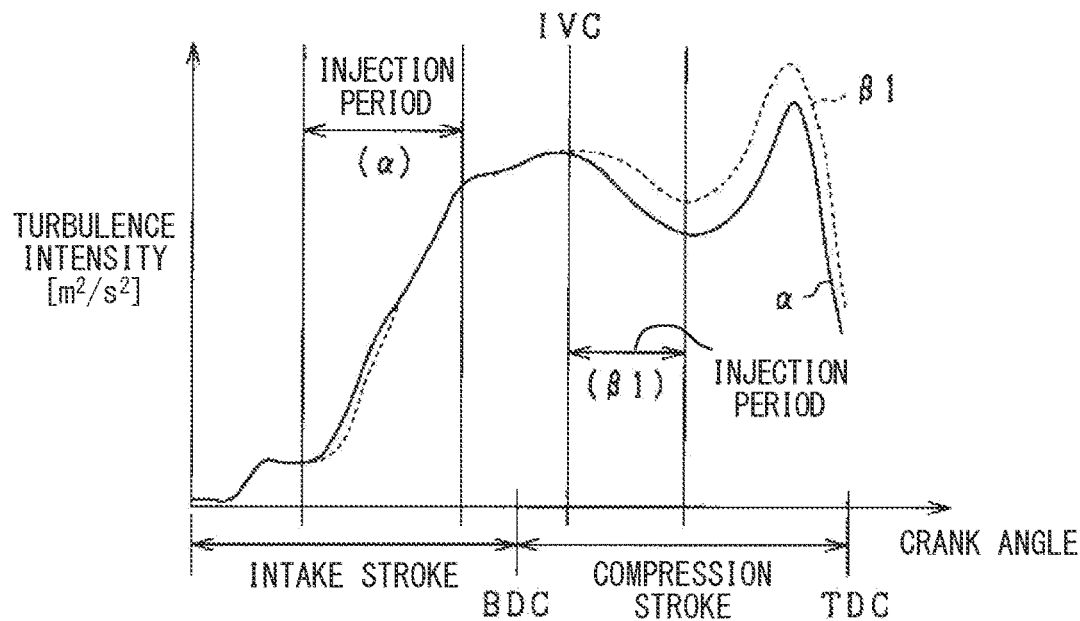
FIG. 11 is a graph illustrating time variations of a turbulence intensity in the combustion chamber.

FIG. 11 is a graph illustrating time variations of the turbulence intensity in the case (solid line) where the normal control α is performed and in the case (broken line) where the first control β1 is performed. Even when the fuel injection is performed in the intake stroke as performed in the normal control α (solid line), the tumble τ has not so satisfactorily developed in the intake stroke, and therefore no efficient cooperation of the injection with the tumble τ, and the turbulence intensity does not so significantly increase. Additionally, in this case, a time to the compression top dead center TDD is long, and consequently the turbulence intensity attenuates before the compression top dead center TDC.

By contrast, in the case of the first control β1 (broken line), the fuel injection is performed in the first half of the compression stroke in which the tumble τ has more satisfactorily developed than in the intake stroke and the injection cooperates with the tumble τ, and therefore the turbulence intensity can efficiently be increased thereby. Moreover, the time to the compression top dead center TDC is relatively short, and accordingly the attenuation of the turbulence intensity in the meantime is small. As a result, the turbulence intensity at the compression top dead center TDC is higher than in the case of the normal control α.

Figure 12:
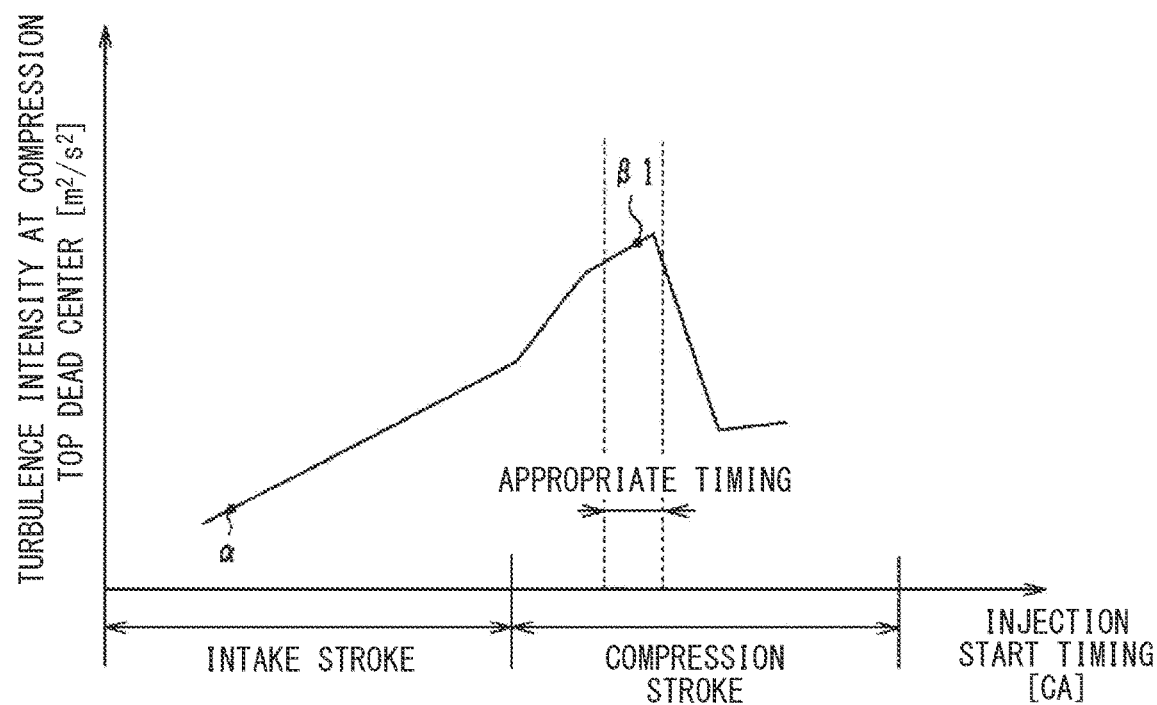
FIG. 12 is a graph illustrating a relationship between the injection start timing and the turbulence intensity at the compression top dead center.

In the graph in FIG. 12, the abscissa axis represents the fuel start timing, while the ordinate axis represents the turbulence intensity at the compression top dead center TDC when the fuel injection is started with the injection start timing represented by the abscissa axis.

When the fuel injection is started before the appropriate timing shown in FIG. 12, the tumble τ has not satisfactorily developed compared to that when the injection is performed with the appropriate timing and the time from the injection to the compression top dead center TDC is elongated, and consequently the turbulence intensity at the compression top dead center represented by the ordinate axis in FIG. 12 cannot so efficiently be increased.

Meanwhile, when the fuel injection is started after the appropriate timing shown in FIG. 12, the fuel injection counteracts the tumble τ, and consequently the turbulence intensity at the compression top dead center represented by the ordinate axis in FIG. 12 is also lower herein than when the injection is performed with the appropriate timing.

By contrast, when the fuel injection is started with the appropriate timing shown in FIG. 12, it is possible to avoid each of the drawbacks and efficiently increase the turbulence intensity at the compression top dead center TDC.

According to the present embodiment, first, the following effect (first effect) can be obtained. In the first control β1, as illustrated in (b) in FIG. 4, the total injection amount is injected after the valve close timing IVC. Thus, it is possible to prevent the air-fuel mixture temporarily cooled by the vaporization heat of the fuel F from being blown back to the intake passage 21 and reduce a period during which the temporarily cooled air-fuel mixture stays in the combustion chamber 38 or the like compared to that when the temporarily cooled air-fuel mixture is blown back thereto. Consequently, it is possible to reduce the amount of the heat received by the air-fuel mixture from the inner wall of the combustion chamber 38 or the like in the meantime and efficiently reduce the temperature in the combustion chamber 38 in the vicinity of the compression top dead center TDC or the like. Therefore, it is possible to more efficiently suppress auto-ignition of the fuel F than when the fuel F is injected before the valve close timing IVC.

Additionally, in the first control β1, the total injection amount is injected before the first half of the compression stroke ends. This can reduce the specific heat ratio in the combustion chamber 38 at an early stage in the compression stroke. Consequently, it is possible to more reliably suppress the temperature rise due to the compression than when the injection is performed in the middle of the second half of the compression stroke to reduce the specific heat ratio in the middle of the second half of the compression stroke. Therefore, it is possible to more efficiently reduce the temperature in the combustion chamber 38 in the vicinity of the compression top dead center TDC or the like and more efficiently suppress the auto-ignition of the fuel F than when the fuel F is injected in the second half of the compression stroke.

Additionally, the following effect (second effect) can also be obtained. As illustrated in FIG. 2, in the first control β1, the fuel injection is performed in the first half of the compression stroke in which the tumble τ has more satisfactorily developed than in the intake stroke and the injection cooperates with the tumble τ. Accordingly, it is possible to efficiently increase the turbulence intensity. This can efficiently accelerate flame propagation. As a result, this effect can also suppress the auto-ignition and suppress the knock.

Still additionally, the following effect (third effect) can also be obtained. In the present embodiment, the total injection amount in one combustion cycle is preferably injected within the period during which the injection cooperative state illustrated in FIG. 2 is established. As a result, it is possible to more efficiently enhance the tumble τ and more efficiently increase the turbulence intensity.

Yet additionally, the following effect (fourth effect) can also be obtained. As illustrated in FIG. 2, when the fuel F is injected so as to cooperate with the tumble τ, the fuel F is more likely to reach a wall surface of the combustion chamber 38 and more likely to cause fuel wetting than when the fuel F is injected to counteract the tumble τ. However, as illustrated in FIG. 8, the injection holes 44 of the injection device 40 are provided with the atomization structures 45 for atomizing the fuel F to be injected, and therefore such a situation can efficiently be prevented.

Still additionally, the following effect (fifth effect) can also be obtained. As illustrated in FIGS. 6 and 7, when the front distance L as the distance from each of the injection holes 44 to the facing portion is short, the fuel wetting may be likely to occur at the facing portion. However, in the present embodiment, as illustrated in FIG. 8, the combustion system is configured such that the penetration of the fuel F injected from the injection hole 44 at the shorter front distance L is lower than the penetration of the fuel F injected from the injection hole 44 at the longer front distance L. As a result, it is possible to efficiently prevent the fuel wetting from occurring at the facing portion to each of the injection holes 44.

Yet additionally, the following effect (sixth effect) can also be obtained. When it is determined that the state of exhaust does not fall within the allowable range in a state in which the first control β1 illustrated in (b) in FIG. 4 is executed, the first control unit 67 makes a correction so as to advance the fuel injection start timing beyond the valve close timing IVC or increase the injection pressure of the injection device 40. As a result, when the state of exhaust does not fall within the allowable range, by making an appropriate correction, it is possible to improve the state of exhaust.

Still additionally, the following effect (eighth effect) can also be obtained. When the computed ignition timing is on the delayed side of the predetermined timing, the first control unit 67 does not delay the ignition timing from the predetermined timing, and increases the injection pressure of the injection device 40. As a result, the ignition timing is extremely delayed to be able to avoid such a drawback as an extreme torque reduction.

Yet additionally, the following effect (ninth effect) can also be obtained. The normal control α is executed on the condition that it is determined that the knock region state is not established. As a result, in the normal control α, it is possible to execute control specialized for increasing the torque or the like without caring about knock suppression.

Still additionally, the following effect (tenth effect) can also be obtained. In a state in which the blowback is small, even when the fuel F is injected during a period from the intake bottom dead center BDC to the valve close timing IVC, an amount of the fuel F injected and blown back to the intake passage 21 is not so large. By contrast, in the present embodiment, when it is determined by the blowback determination unit 63 that the state of occurrence of the blowback falls within the allowable range, the second control β2 in which the fuel injection is started earlier than in the case of the first control β1 is executed by the second control unit 68. In other words, in the state in which the blowback is thus small, it is prioritized to perform the fuel injection early and reduce the specific heat ratio early without caring about the blowback. This can efficiently suppress a temperature rise in the combustion chamber 38 in the compression stroke. Thus, it is possible to more efficiently suppress the auto-ignition and more efficiently suppress the knock. In addition, by thus starting the fuel injection early, it is also possible to improve the state of exhaust.

Yet additionally, the following effect (eleventh effect) can also be obtained. In the second control β2 illustrated in (c) in FIG. 4, at the later timing of the intake bottom dead center BDC and the valve close timing IVC, the injection of the total injection amount is ended. Consequently, the entire compression stroke after the valve close timing IVC can be completed in a state in which the specific heat ratio in the combustion chamber 38 is reduced. As a result, it is possible to efficiently suppress the temperature rise in the combustion chamber 38 due to the compression.

Still additionally, the following effect (twelfth effect) can also be obtained. When the rotation speed of the engine 80 is high, the intake cannot catch up with lowering of the piston 35, and the intake is likely to be continued for a while even after the intake bottom dead center BDC. For such reasons, the blowback tends to be smaller. However, when the rotation speed of the engine 80 is high, the blowback determination unit 63 is more likely to determine that the state of occurrence of the blowback falls within the allowable range than when the rotation speed of the engine 80 is low. This allows the state of occurrence of the blowback to be efficiently determined by using the rotation speed of the engine 80.

Yet additionally, the following effect (thirteenth effect) can also be obtained. In the first control β1 illustrated in (b) in FIG. 4, the fuel injection start timing or the like is changed in response to the change of the valve close timing IVC. As a result, even when the valve close timing IVC is changed, appropriate measures can be taken in response thereto.

Still additionally, the following effect (fourteenth effect) can also be obtained. In the second control β2 illustrated in (c) in FIG. 4, timing of ending the injection of the total injection amount or the like is changed in response to the change of the valve close timing IVC. As a result, even when the valve close timing IVC is changed, appropriate measures can be taken in response thereto.

Second Embodiment

Next, a description will be given of the second embodiment. In the following embodiments, members which are the same as or corresponding to those in the previous embodiment and the like are denoted by the same reference signs. The present embodiment will be described on the basis of the first embodiment with emphasis on a point different from that in the first embodiment.

Figure 13:
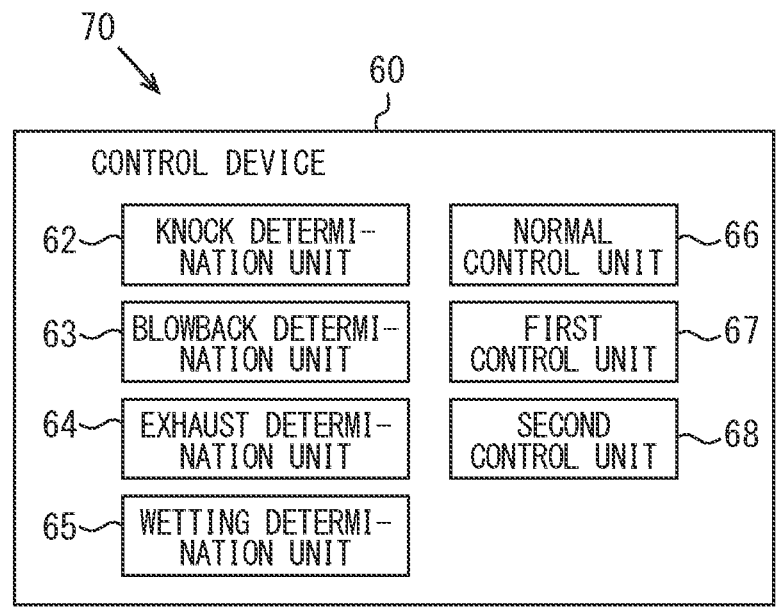
FIG. 13 is a schematic diagram illustrating a control device of a fuel combustion system in a second embodiment.

FIG. 13 is a schematic diagram illustrating the control device 60 of the combustion system 70 in the present embodiment. The control device 60 further includes a wetting determination unit 65. The wetting determination unit 65 determines whether or not a state of occurrence of fuel wetting in which the fuel F injected from the injection device 40 adheres in a liquid state to the inner wall of the combustion chamber 38 falls within a predetermined allowable range. Whether or not the fuel wetting falls within the allowable range can be determined on the basis of, e.g., an amount of CO generation or an amount of PM generation detected by the exhaust determination unit 64.

Figure 14:
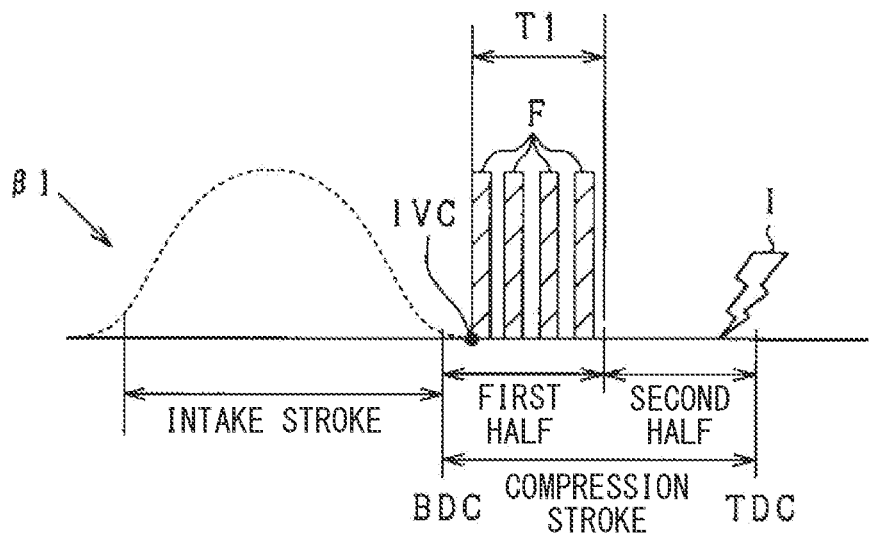
FIG. 14 is a time chart illustrating first control by the control device.

Then, when it is determined that the state of occurrence of the fuel wetting does not fall within the allowable range by the exhaust determination unit 64 in a state in which the first control β1 is executed, the first control unit 67 performs control so as to execute multi-stage injection, while maintaining the first control β1, as illustrated in FIG. 14.

According to the present embodiment, the following effect (seventh effect) can be obtained. When it is determined by the wetting determination unit 65 that the state of occurrence of the fuel wetting does not fall within the allowable range in the state in which the first control β1 is executed, the first control unit 67 performs control so as to execute the multi-stage injection, while maintaining the first control β1. Accordingly, when the state of occurrence of the fuel wetting does not fall within the allowable range in the first control β1, it is possible to appropriately perform the multi-stage injection and thereby improve the state of occurrence of the fuel wetting.

OTHER EMBODIMENTS

Each of the foregoing embodiments can be implemented by being modified as follows. For example, in each of the embodiments, the valve close timing IVC for the intake valve 23 can be varied, but the valve close timing IVC may also be fixed. In this case, the first control β1 and the second control β2 can more easily be carried out. Additionally, in each of the embodiments, e.g., the plurality of injection holes 44 are provided in the injection device 40 but, instead, the only one injection hole 44 may also be provided. Also, in FIG. 8, for example, the atomization structures 45 are provided only in some of the injection holes 44, but the atomization structures 45 may also be provided in all of the injection holes 44.

Still additionally, in each of the embodiments, e.g., the control device 60 includes the blowback determination unit 63 and the second control unit 68 but, instead, it may also be possible that the control device 60 has neither the blowback determination unit 63 nor the second control unit 68, and executes control by using only the normal control unit 66 and the first control unit 67. Moreover, in this case, it may also be possible that the control device 60 includes neither the knock determination unit 62 nor the normal control unit 66, and executes control by using only the first control unit 67. In such cases also, the first control β1, which is the point of the present disclosure, can be carried out.

Also, for example, in each of the embodiments, in the first control β1, the fuel injection is performed so as to cooperate with the tumble τ, but it may also be possible to execute the fuel injection irrespective of whether or not the fuel injection cooperates with the tumble τ. In this case also, the effect (first effect) of suppressing the auto-ignition by achieving both of effective use of the vaporization heat and an early reduction in the specific heat ratio and the like can still be achieved.

It is to be construed that, while the present disclosure has been described in accordance with the embodiments, the present disclosure is not limited to the embodiments and structures. The present disclosure encompasses various modifications and variations in the equivalent range. In addition, various combinations and modes, and further, other combinations and modes including only one element thereof, less or more, are intended to fall within the scope and spirit of the present disclosure.

What is claimed is:

1. A combustion system applicable to an engine, the engine including a combustion chamber, an intake passage to take in air into the combustion chamber, an intake valve to open and close the intake passage, an exhaust passage to exhaust gas from the combustion chamber, and an exhaust valve to open and close the exhaust passage, the combustion system comprising:

an injection device configured to inject fuel into the combustion chamber;

a spark plug configured to ignite fuel in the combustion chamber; and a control device configured to control the injection device and the spark plug, wherein the control device includes a first control unit configured to execute a predetermined first control to cause the injection device to inject a total injection amount corresponding to all of fuel to be injected in one combustion cycle of the engine within a first period from valve close timing, at which the intake valve is brought into a closed state, until a first half of a compression stroke of the engine ends, the control device includes a knock determination unit configured to determine whether a knock region state, in which knock possibly occurs in the engine, is established and a predetermined normal control unit, the normal control unit is configured to execute a predetermined normal control on determination of the knock determination unit that the knock region state is not established, the first control unit is configured to execute the first control on determination of the knock determination unit that the knock region state is established, the control device includes a blowback determination unit configured to determine whether a state of occurrence of gas blowback from the combustion chamber to the intake passage falls within a predetermined allowable range and a predetermined second control unit, the first control unit is configured to execute the first control on determination of the knock determination unit that the knock region state is established and on determination of the blowback determination unit that the state of occurrence of the blowback does not fall within the allowable range, and the second control unit is configured to execute a second control to start fuel injection earlier than the first control on determination of the knock determination unit that the knock region state is established and on determination of the blowback determination unit that the state of occurrence of the blowback falls within the allowable range.

2. The combustion system according to claim 1, wherein the combustion chamber is configured to repeatedly reduce and enlarge in size with a reciprocating motion of a piston in the engine, of directions of the reciprocating motion of the piston, a direction, in which the combustion chamber reduces in size, is a top dead center direction, and a direction opposite thereto is a bottom dead center direction, a predetermined direction perpendicular to the directions of the reciprocating motion is a predetermined direction, a direction opposite thereto is an anti-predetermined direction, a direction including, as a component, the predetermined direction is a predetermined direction side, and a direction including, as a component, the anti-predetermined direction is an anti-predetermined direction side, the injection device is placed in a state in which an injection center line corresponding to an average of injection directions for the total injection amount faces the predetermined direction side, the engine is configured to generate a tumble in the combustion chamber to cause the tumble to flow on the predetermined direction side in the top dead center direction relative to a rotation center thereof, flow on the anti-predetermined direction side in the bottom dead center direction relative to the rotation center thereof, and move the rotation center in the top dead center direction as the combustion chamber reduces in size, establish, in the first half of the compression stroke, a cooperative injection state, in which a virtual extension line of the injection center line extends through a portion in the top dead center direction relative to the rotation center, and the tumble flows on the predetermined direction side, and establish, in a second half of the compression stroke, a counter injection state, in which the virtual extension line of the injection center line extends through a portion in the bottom dead center direction relative to the rotation center, and the tumble flows on the anti-predetermined direction side, and the first control unit is configured to execute the first control to cause the injection device to perform injection at timing at which the cooperative injection state is established in the first half of the compression stroke.

3. The combustion system according to claim 2, wherein the first control unit is configured to execute the first control to cause the injection device to inject the total injection amount within a period during which the cooperative injection state is established.

4. The combustion system according to claim 1, wherein the injection device has an injection hole to inject fuel, the injection hole has an atomization structure to atomize fuel to be injected, and
the atomization structure has at least one of
a widening structure, which widens in a tapered form or in a stepwise form in an injection direction or
an oval structure having an oval opening.

5. The combustion system according to claim 1, wherein the injection device has a plurality of injection holes,
a lengthwise direction of a center line of each of the injection holes is an injection direction of the injection hole,
a portion of an inner wall of the combustion chamber, which faces directly in front of each of the injection holes in the injection direction when fuel is injected, is a facing portion to the injection hole,
a distance from each of the injection holes to the facing portion is a front distance of the injection hole, and
the combustion system is configured, such that penetration of fuel, which is injected from the injection hole at the front distance shorter than a predetermined length, is lower than penetration of fuel, which is injected at the same time from the injection hole at the front distance equal to the predetermined length.

6. The combustion system according to claim 1, wherein the control device includes an exhaust determination unit configured to determine whether a state of exhaust in the engine falls within a predetermined allowable range, and
on determination of the exhaust determination unit that the state of exhaust does not fall within the allowable range in a state where the first control unit executes the first control, the first control unit is configured to
make a correction by advancing fuel injection start timing beyond the valve close timing to perform a control other than the first control or
make a correction to increase an injection pressure of the injection device.

7. The combustion system according to claim 1, wherein the control device includes a wetting determination unit configured to determine whether a state of occurrence of fuel wetting, in which fuel injected from the injection device adheres in a liquid state to an inner wall of the combustion chamber, falls within a predetermined allowable range, and
on determination of the wetting determination unit that the state of occurrence of the fuel wetting does not fall within the allowable range in a state where the first control unit executes the first control, the first control unit is configured to perform a control to perform multi-stage injection, while maintaining the first control.

8. The combustion system according to claim 1, wherein the first control unit is configured to
compute ignition timing, which suppresses knock,
control actual timing of ignition by the spark plug at the computed ignition timing, when the computed ignition timing is on an advanced side of predetermined timing, and
increase an injection pressure of the injection device, without delaying the actual timing of ignition by the spark plug from the predetermined timing, when the computed ignition timing is on a delayed side of the predetermined timing.

9. The combustion system according to claim 1, wherein the second control unit is configured to execute the second control to
start the fuel injection before later one of an intake bottom dead center of the engine and the valve close timing, and
end injection of the total injection amount by the later one.

10. The combustion system according to claim 1, wherein the blowback determination unit is configured to
determine, based on a rotation speed of the engine, whether the state of occurrence of the blowback falls within the allowable range, and
allow to more easily determine that the state of occurrence of the blowback falls within the allowable range when the rotation speed of the engine is higher than a predetermined speed than when the rotation speed is equal to the predetermined speed.

11. The combustion system according to claim 1, wherein the engine is configured to change the valve close timing, and
in the first control, fuel injection start timing is changed in response to the change of the valve close timing.

12. The combustion system according to claim 1, wherein the engine is configured to change the valve close timing, and
in the first control, a fuel injection start timing is changed in response to change of the valve close timing while, in the second control, injection end timing for the total injection amount is changed in response to the change of the valve close timing.

13. A combustion system applicable to an engine, the engine including a combustion chamber, an intake passage to take in air into the combustion chamber, an intake valve to open and close the intake passage, an exhaust passage to exhaust gas from the combustion chamber, and an exhaust valve to open and close the exhaust passage, the combustion system comprising:
an injection device configured to inject fuel into the combustion chamber;
a spark plug configured to ignite fuel in the combustion chamber; and
a controller configured to
determine whether a knock region state, in which the knock possibly occurs in the engine, is established,
determine whether a state of occurrence of gas blowback from the combustion chamber to the intake passage falls within a predetermined allowable range,
execute a normal control, on determination that the knock region state is not established,
execute a first control, on determination that the knock region state is established and that the state of occurrence of the blowback does not fall within the allowable range, to cause the injection device to inject a total injection amount corresponding to all of fuel to be injected in one combustion cycle of the engine within a first period from valve close timing, at which the intake valve is closed, until a first half of a compression stroke of the engine ends, and
execute a second control, on determination that the knock region state is established and that the state of occurrence of the blowback falls within the allowable range, to start fuel injection earlier than the first control.

\* \* \* \* \*